(12) United States Patent
Pedreira et al.

(10) Patent No.: US 9,196,065 B2
(45) Date of Patent: Nov. 24, 2015

(54) POINT RELOCATION FOR DIGITAL INK CURVE MODERATION

(71) Applicant: Microsoft Corporation, Redmond, WA (US)

(72) Inventors: Jorge Pereira Pedreira, Seattle, WA (US); Eric Brumer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 13/781,871

(22) Filed: Mar. 1, 2013

(65) Prior Publication Data

US 2014/0247276 A1     Sep. 4, 2014

(51) Int. Cl.
  *G06T 5/00*     (2006.01)
  *G06T 11/20*    (2006.01)
  *G06F 3/048*    (2013.01)

(52) U.S. Cl.
  CPC .............. *G06T 11/203* (2013.01); *G06F 3/048* (2013.01)

(58) Field of Classification Search
  None
  See application file for complete search history.

(56) References Cited

U.S. PATENT DOCUMENTS

| | | | |
|---|---|---|---|
| 7,057,615 B2 | 6/2006 | Wang et al. | |
| 7,623,998 B1 | 11/2009 | Yu | |
| 2002/0064308 A1* | 5/2002 | Altman et al. | 382/187 |
| 2003/0025713 A1* | 2/2003 | Wang et al. | 345/611 |
| 2004/0105584 A1* | 6/2004 | Napper et al. | 382/186 |
| 2004/0165774 A1* | 8/2004 | Koubaroulis et al. | 382/179 |
| 2005/0289452 A1 | 12/2005 | Kashi et al. | |
| 2010/0079602 A1 | 4/2010 | Napper et al. | |
| 2011/0199297 A1 | 8/2011 | Antonyuk et al. | |
| 2012/0050293 A1* | 3/2012 | Carlhian et al. | 345/442 |

OTHER PUBLICATIONS

Mohamed, Khaireel A. Concepts and solutions for efficient handling of the digital ink. Diss. Albert-Ludwigs-Universität Freiburg, 2009.*
Henzen, Alex, et al. "Sketching with a low-latency electronic ink drawing tablet." Proceedings of the 3rd international conference on Computer graphics and interactive techniques in Australasia and South East Asia. ACM, 2005.*
Ghoting, Amol, Srinivasan Parthasarathy, and Matthew Eric Otey. "Fast mining of distance-based outliers in high-dimensional datasets." Data Mining and Knowledge Discovery 16.3 (2008): 349-364.*

(Continued)

*Primary Examiner* — Tize Ma
*Assistant Examiner* — Yu Chen
(74) *Attorney, Agent, or Firm* — Aneesh Mehta; Kate Drakos; Micky Minhas

(57) ABSTRACT

With some splines, such as cardinal splines, irregularly spaced data points may cause undesired bumps. Bump moderation makes a spline curve more visually appealing by reducing bumps, and by doing so even if the curve happens to be already smooth in a mathematical sense. Data points P1, P2, and P3 are not suitably spaced an outlier is present in a set of linear distances between the points. The bump is moderated by moving a point of the spline along a pathway to a position for which the data points P1, P2, and P3 are suitably spaced. The pathway may be a Bezier segment or a line segment. A point is moved on the pathway to its midpoint, or to a particular portion of the pathway such as its central third or central fifth.

20 Claims, 3 Drawing Sheets

1000

(56) References Cited

OTHER PUBLICATIONS

Mohamed, Khaireel A., "Concepts and Solutions for Efficient Handling of the Digital Ink", Retrieved at <<http://www.freidok.uni-freiburg.de/volltexte/7361/pdf/thesis_final_khaireel_a_mohamed_Mar_2010.pdf>>, Mar. 23, 2010, pp. 270.

Hu, et al., "Optimization of Point Selection on Digital Ink Curves", Retrieved at <<http://www.icfhr2012.uniba.it/paper085.pdf>>, in International Conference on Frontiers in Handwriting Recognition, Sep. 18, 2012, pp. 6.

Loop, Charles, "Smooth Spline Surfaces over Irregular Meshes", Retrieved at <<http://citeseerx.ist.psu.edu/viewdoc/download?doi=10.1.1.83.3529&rep=rep1&type=pdf>>, The Proceedings of the 21st Annual Conference on Computer Graphics and Interactive Techniques, Jul. 1994, pp. 8.

Henzen, et al., "Sketching with a Low-latency Electronic Ink Drawing Tablet", Retrieved at <<http://citeseerx.ist.psu.edu/viewdoc/download?doi=10.1.1.103.7677&rep=rep1&type=pdf>>, in the 3rd International Conference on Computer Graphics and Interactive Techniques in Australasia and South East Asia, Nov. 2005, pp. 10.

"Project Austin", Retrieved at <<http://austin.codeplex.com/>>, Retrieved Date: Jan. 25, 2013, pp. 3.

Brumer, Eric, "Project Austin Part 3 of 6: Ink Smoothing", Retrieved at <<http://blogs.msdn.com/b/vcblog/archive/2012/10/04/10348486.aspx>>, Oct. 4, 2012, pp. 5.

"Outlier", Retrieved at <<http://en.wikipedia.org/wiki/Outlier>>, Feb. 19, 2013, 5 pages.

"Chapter 4 Curves: Extract: Quadratic Bézier Spline", Retrieved at <<http://www.learnsvg.com/books/learnsvg/html/bitmap/chapter04/page04-1.php>>, copyright 2002-2011, 4 pages.

"Bézier curve", Retrieved at <<http://en.wikipedia.org/wiki/Bézier_curve>>, Dec. 30, 2012, 8 pages.

"Cubic Hermite spline", Retrieved at <<http://en.wikipedia.org/wiki/Cubic_Hermite_spline#Cardinal_spline>>, Dec. 15, 2012, 4 pages.

\* cited by examiner

POINT RELOCATION FOR DIGITAL INK CURVE MODERATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As a stylus or another pen-tip moves through a two-dimensional or three-dimensional space, the pen-tip's location can be sampled, thereby providing data points indicating one or more curves through which a digital ink curve can be rendered. Depending on factors such as the speed of the pen-tip, the path followed by the pen-tip, and the sampling rate, the data points may be either more or less accurate in their approximation of the actual curve followed. Such accuracy may be the most important criterion for evaluating a curve which is visually rendered through or near the data points. The foregoing observations are made with the present claims in mind. Accordingly, one of skill in the art who did not have access to the claims would not necessarily have recognized the observations made here.

SUMMARY

Some embodiments are helpful in computer graphic environments which involve collecting curve data points as a user moves a pen-tip, smoothing curves using splines, and removing undesired artifacts that arise from smoothing when fitting a curve to a spline, such as unwanted bumps. Some embodiments are directed to the technical problem of making a curve more visually appealing by reducing apparent bumps, and doing so even if the curve happens to be already smooth in a mathematical sense (e.g., has a continuous first derivative). Some embodiments remove undesired artifacts in real-time. Some embodiments provide tools or techniques for visibly moderating a bump in a digital ink curve.

The term "moderating" (and "moderation", "moderated", etc.) has a special meaning herein, which is formally defined below in terms of the relative distance between data points on a curve. Informally, moderating a bump makes it less pronounced, thereby making a curve appear less bumpy.

In some embodiments, bump moderation utilizes a particular device which has a processor, a computer-readable memory, a display, and bump moderation logic. "Bump moderation logic" means (a) software interoperable with general-purpose computational hardware to perform bump moderation, and/or (b) special-purpose computational hardware designed to perform bump moderation.

Some embodiments get in the computer-readable memory N data points for the digital ink curve, with N being at least three. The N data points include at least a point P1, a point P2, and a point P3, which are positioned in that order relative to each other along a spline of the digital ink curve. The spline may be a cubic Hermite spline segment with finite difference tangents, a cardinal spline segment, a Catmull-Rom spline segment, or another spline of cubic or higher order. The bump is part of the spline. The bump has a peak that is located between P1 and P2.

As a particular example in which outliers are defined in terms of a cutoff threshold for ratios of point-to-point distances, some embodiments computationally determine that the data points P1, P2, and P3 are not suitably spaced with respect to a factor R, in that the linear distance between P1 and P2 is larger than R times the linear distance between P2 and P3. Example values and value ranges for R are given throughout this document.

Some embodiments moderate the bump by altering computer-readable memory content, namely, by moving a control point of the spline to a position for which the data points P1, P2, and P3 are suitably spaced with respect to the factor R when P2 is pinned to the curve as the control point is moved. In some embodiments, the data point P2 is also the control point of the spline, so P2 is inherently pinned to the curve.

In some embodiments, bump moderation occurs as the curve is being drawn on a display. In some, the display displays the spline as part of a digital ink curve, and bump moderation logic moderates the bump in real-time as the digital ink curve is being defined. The curve can be defined by using curve data (P1, P2, P3, . . . ) from a data input device such as a stylus or a fingertip position sensor.

Some embodiments identify a control point pathway which is neither the curve nor the spline, and move the spline control point along the control point pathway. That is, the control point pathway contains the control point both before and after bump moderation. In some, the control point pathway is not a subset of the curve or the spline, and in some it contains at least one control point of the spline. The control point may be moved to a particular location on the control point pathway, such as its midpoint, or the control point may be moved to a particular portion of the control point pathway, such as its central third or central fifth. In some embodiments, the control point pathway includes a quadratic Bezier spline segment defined by P1, P2, and P3 before the bump moderation, with the quadratic Bezier spline segment passing through P1 and P3. In some, P2 is also a quadratic Bezier control point for the control point pathway. In some, the control point pathway includes a straight line segment, such as the line segment defined by P1 and P2 before bump moderation, or a straight line segment defined by P1 and P3 before bump moderation.

Some embodiments display at least a portion of the digital ink curve on the display with the bump moderated. The bump can be moderated before the curve is displayed, so that only the moderated bump is shown to users, or else both versions of the bump (pre- and post-moderation) can be displayed, depending on the embodiment.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
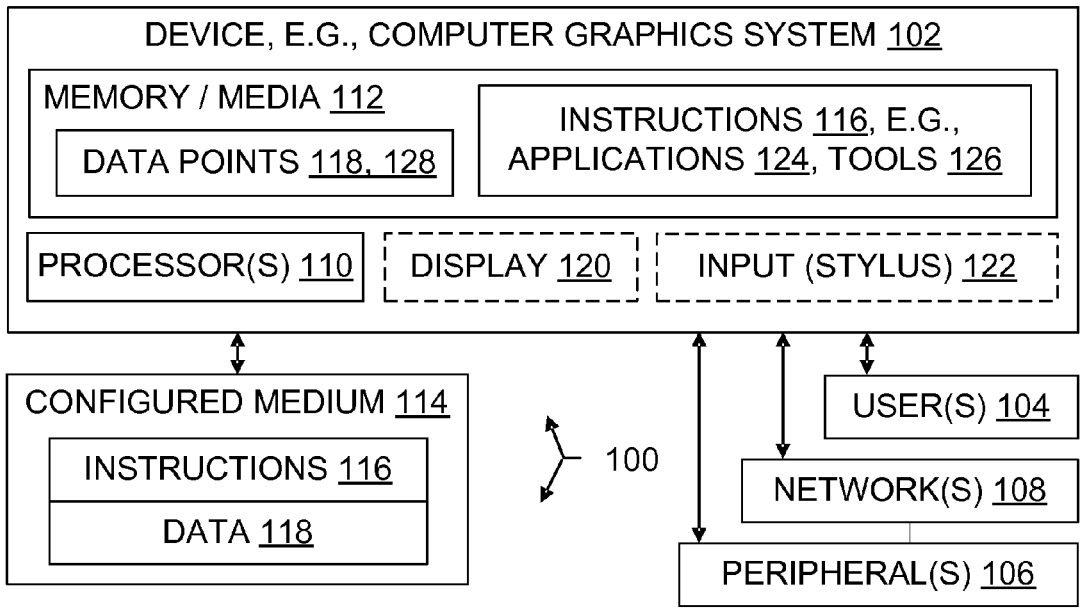
FIG. 1 is a block diagram illustrating a computer graphics system having at least one processor and at least one memory which interact with one another under the control of graphics software, and other items in an operating environment which may be present on multiple network nodes, and also illustrating configured storage medium embodiments (as opposed to propagated signals)

Some embodiments are directed at technical problems related to reliable smoothing of digital pen curves amidst irregular input samples. In general, spline techniques are a low-latency, real-time solution for digital ink smoothing. However, they suffer from drawbacks when smoothing ink stokes that have irregular input samples. Undesirable curve appearance features can arise from faulty input drivers when some samples are not read by ink rendering code, and/or from input drivers with low sample rates. Undesirable curve appearance features can also appear even when input is not faulty. Input drivers with low sample rates are common in capacitive stylus systems, or with inexpensive pen recognition hardware. If a spline is naively applied in these environments, the resulting smoothed curves can have nubs (unappealing bumps) which do not follow the ink strokes and make ink strokes look unrealistic.

Consider an application for note-taking using digital paper. As the user draws curves using a stylus or a mouse, graphics code can perform efficient real-time ink smoothing using a cardinal spline. The cardinal spline allows low-latency, real-time digital ink smoothing. However, the cardinal spline may perform very poorly by producing visually unappealing results when the input samples are irregularly spaced. Irregular data point spacing can happen if the input sample rate is not high, or with faulty input drivers. The resultant curves appear bumpy.

Some embodiments described herein detect when a point is irregularly spaced with respect to the points around it, and then move the point such that the spacing becomes even. Then code can apply the cardinal spline techniques to render a curve without little or no apparent bumpiness.

Some embodiments described herein may be viewed in a broader context. For instance, concepts such as control points, data points, distances, ratios, splines, and visual appearance may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving control points, data points, distances, ratios, splines, and/or visual appearance are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as quantitatively defining and detecting bumpiness, which is otherwise only a subjective visual aesthetic quality not amenable to computation. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein computationally detect bumps even in visually smooth splines, and proactively moderate those bumps in real-time. Third, some embodiments include technical adaptations such as control point pathways and a range of values for a factor R which defines suitable spacing for curve data points. Fourth, technical advantages of some embodiments include improved realism of curves that are based on irregularly spaced position samples, and/or better use of display area (e.g., screen space) because control point movements can be done automatically instead of requiring a separate user interface.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "moderating" a bump in a curve means changing the location of a spline control point of the curve in order to bring points on the curve within a previously determined criterion for "suitable spacing."

The phrase "suitable spacing" (and "suitably spaced", "spaced suitably", etc.) likewise has a special meaning herein. A set of consecutive points of a curve are said herein to be "suitably spaced" points when there are no "outliers" within the corresponding set of distances between the points.

As used herein, "outliers" are identified as such according to one or more criteria that are chosen by a user or hard-coded in place by a developer prior to drawing the curve. Under a criterion (a), an outlier is present if any point-to-point distance in the set is greater than R times any other point-to-point distance in the set. This criterion is illustrated by several specific examples herein, but other criteria lie within the scope of some embodiments. Under a criterion (b) an outlier is present if any point-to-point distance in the set is more than one standard deviation away from the average of the distances in the set. Under a criterion (c) an outlier is present if any point-to-point distance in the set satisfies at least one of the following familiar definitions: Chauvenet's criterion, Grubbs' test for outliers, Peirce's criterion, Dixon's Q test, American Society for Testing and Materials E178 Standard Practice for Dealing With Outlying Observations, an interquartile range test. Under a criterion (d), an outlier is present if any point-to-point distance in the set satisfies another statistical criterion that is already recognized in industry or academia to identify an outlier (in the commonly used sense, as opposed to the specific definition of "outlier" herein). Different embodiments use different criteria. If no criterion is expressly stated for a particular embodiment, the criterion (d) applies.

Expressly specifying a range of values for a factor when discussing an embodiment herein means that the factor lies within the specified range for the embodiment in question, but it does not necessarily mean that the endpoints of the range are also specified expressly within the embodiment. In addition, ranges are presumed to include the endpoints. For example, if a factor R is said to lie within a range from 2 to 7, or is equivalently (endpoints are presumptively included) said to be greater than or equal to 2 and less than or equal to 7, then code specifying R as 5 conforms to this aspect of the embodiment even if the code does not also mention 2 and 7 as limits on R.

An observant reader will note that all the examples herein either allow or insist on 5 as a value for the factor R. However, this does not mean that excluding 5 as a value for R in and of itself moves an implementation outside the scope of the present disclosure. Intentionally prohibiting the value 5 itself, while allowing nearby values (e.g., 5.1, or 4), would rightly be seen as merely a hypertechnical attempt to avoid falling within the embodiments described while still keeping benefits of bump moderation such as an increase in curves' visual appeal.

Unless expressly stated otherwise, as used herein a portion of a spline is considered "visually smooth" when any two parts of the portion which meet at a point share a common tangent direction at the point where those two parts meet. Visibility of actual tangents or of curve portions is not required under this definition.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, communicating, configuring, defining, determining, displaying, drawing, getting, having, identifying, including, moderating, moving, passing, positioning, sampling, spacing, utilizing (and alters, altered, communicates, communicated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. No claim covers a signal per se. A memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. As used herein, "computer readable medium" means a computer readable storage medium, and therefore not a propagating signal per se.

Operating Environments

With reference to FIG. 1, an operating environment 100 for an embodiment may include a computer graphics system 102. The computer graphics system 102 may be a multiprocessor computer system, or not. An operating environment may include one or more machines in a given computer system, which may be clustered, client-server networked, and/or peer-to-peer networked. An individual machine is a computer graphics system, and a group of cooperating machines is also a computer graphics system. A given computer graphics system 102 may be configured for end-users, e.g., with applications, for administrators, as a server, as a distributed processing node, and/or in other ways.

Human users 104 may interact with the computer graphics system 102 by using displays 120, keyboards, and other peripherals 106 (including a stylus, pen, touchscreen, motion capture device, and/or other curve input device 122), via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, instructions 116 for a game application 124 may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer graphics system 102 or with another system embodiment using one or more connections to a network 108 via network interface equipment, for example.

The computer graphics system 102 includes at least one logical processor 110. The computer graphics system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (as opposed to merely a propagated signal). In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as user movements, product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device 102 (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 124 and/or tools 126 have code for performing graphics operations such as defining, displaying, or editing curves in 2-dimensional or 3-dimensional spaces. Software The applications 124, tools 126, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 120, data point input devices 122, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
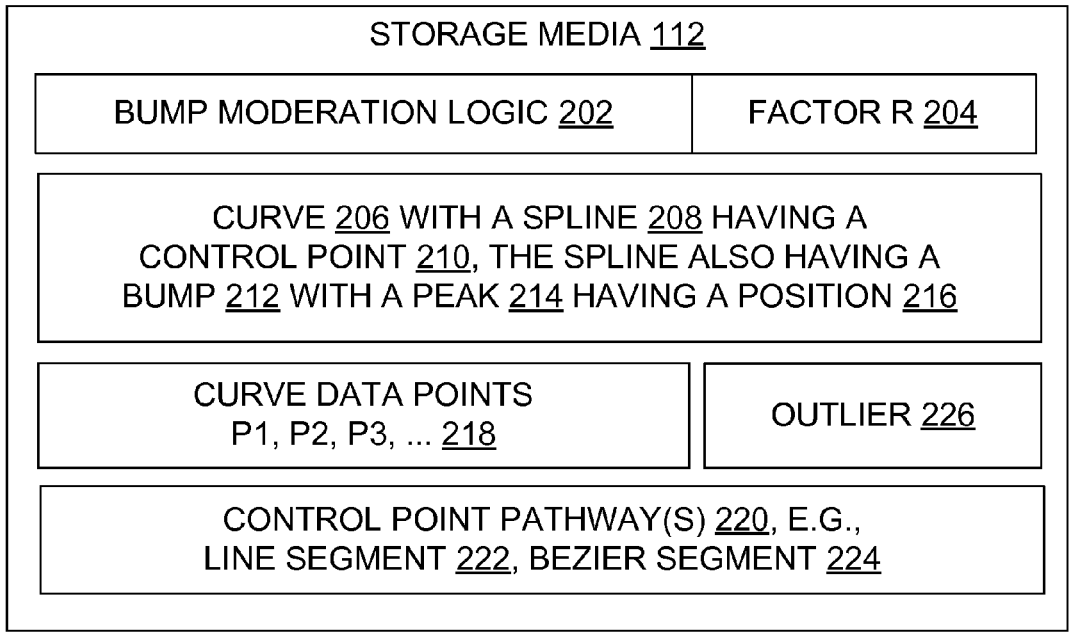
FIG. 2 is a block diagram illustrating aspects of bump moderation in an example architecture.
Figure 3:
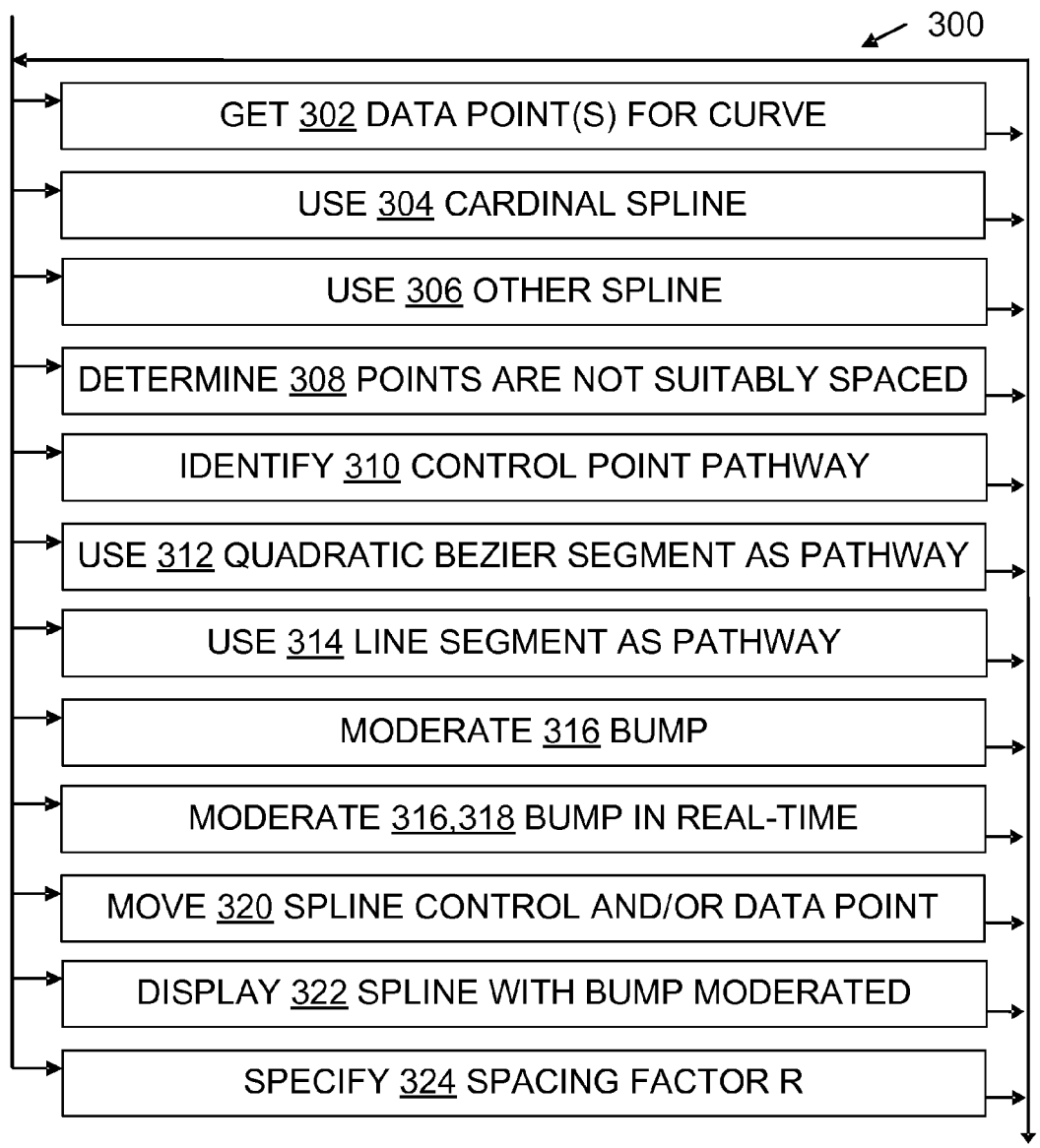
FIG. 3 is a flow chart illustrating steps of some process and configured storage medium embodiments.

FIG. 2 illustrates aspects of an architecture which is suitable for use with some embodiments; FIG. 3 illustrates related processes. Some embodiments include at least one logical processor 110, an instruction memory 112 in operable communication with the logical processor, and a digital ink display, vector graphics display, or other display 120. Some embodiments provide bump moderation logic 202 which moderates bumps in visual curves, based on detection of modification of curve data point 218 spacing with regard a ratio R 204 or with following a determination 308 that an outlier 226 is present according to another outlier criterion. A given curve 206 (whether fully drawn or not) with one or more splines 208 has both data points 218 and control points 210. Curve 206 data points 118, 128 are received as samples from a stylus or other input device 122. In some cases, a given point is both a data point and a control point; cardinal splines, for example, have four control points, the middle two of which are also data points because the cardinal spline goes through those two. In cases of most interest here, a spline 208 has a bump 212 with a pronounced peak 214 at some position 216. By moving data points and/or control points along a pathway 220, such as a certain line segment 222 or Bezier segment 224, the bump is moderated, thus becoming less pronounced and more visually appealing. In general, a cubic spline (such as a Catmull-Rom spline, Hermite spline, or cardinal spline, among others) will have bumps that look like cubic functions. However, embodiments are not limited to use with cubic splines. A quadratic spline will generally have bumps 212, which tend to resemble quadratic functions. Similarly, an Nth order spline may have undesired bumps 212. Smoothing tools and techniques described herein can be used for moderating bumps in a spline of any order.

With reference to FIGS. 1 and 2, some embodiments provide a computer system 102 with a logical processor 110 and a memory medium 112 configured by circuitry, firmware, and/or software to provide technical effects such as smooth curves with moderated bumps prior to a pen-tip lifting from the input surface. Some embodiments are directed at technical problems such as real-time visually appealing curve bump moderation. Some embodiments extend existing graphics functionality with curve bump moderation capabilities described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. Some embodiments operate in a "cloud" computing environment and/or a "cloud" storage environment in which computing services are not owned but are provided on demand. An embodiment may also communicate technical data and/or technical instructions through direct memory access, removable nonvolatile media, or other information storage-retrieval and/or transmission approaches, or an embodiment in a computer system may operate without communicating with other computer systems.

Processes

FIG. 3 illustrates some process embodiments in a flowchart 300. Technical processes shown in the Figures or otherwise disclosed may be performed in some embodiments automatically, e.g., by an application 124 under control of a testing script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments get 302 in the computer-readable memory 112 N data points 218 for a digital ink curve or other curve 206, with N being at least three. The N data points include at least a point P1, a point P2, and a point P3, which are positioned in that order relative to each other along a spline 208 of the curve. The spline 208 may be a cubic Hermite spline segment with finite difference tangents, a cardinal spline segment, a Catmull-Rom spline segment, or another spline of cubic or higher order. A prototype embodiment uses 304 a cardinal spline, but other splines may be used 306 in other embodiments.

Figure 4:
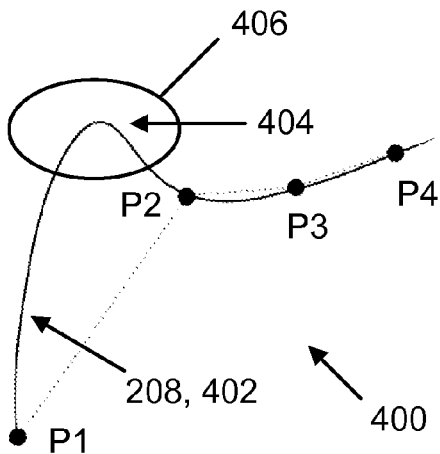
FIG. 4 is part of a curve having a bump and data points that are not suitably spaced, annotated with data point labels, a bump indication, dotted lines that indicate linear distances, and other reference aids.

The bump 212 is part of the spline. In some embodiments, the bump 212 has a peak that is located between P1 and P2. For example, FIG. 4 shows a curve 400 which uses 304 a cardinal spline 208, 402 (208 designates splines generally, 402 is a cardinal spline in particular). A bump 212 is located in the area indicated generally at 406; the bump's peak is designated 404 in this Figure. Points P1, P2, P3, and P4 are also indicated by reference annotations, with the peak 404, 214 located between P1 and P2.

Some embodiments computationally determine 308 that data points are not suitably spaced, namely, determine 308 that at least one outlier 226 is present in a set of point-to-point distances for the data points of a curve 206. In particular, and without excluding other outlier definitions, an embodiment may determine 308 that the data points P1, P2, and P3 are not suitably spaced with respect to a factor R under outlier criterion (a) defined above. This determination may be accomplished, for example, by logic 202 which calculates and compares point-to-point distances for recent data points 208 of sequence S and concludes that the linear distance between P1 and P2 is larger than R times the linear distance between P2 and P3. Another embodiment checks the ratio of the P1-P3 distance to the P2-P4 distance. Another embodiment takes the most recent three data points, forms a triangle having them as vertices, and determines that outlier(s) are present based on one or more of the angles, e.g., determining 308 that an outlier 226 is present if any angle of the triangle is greater than eighty degrees (or another predetermined angle threshold). Some example values and value ranges for R specified 324 in respective embodiments are:

R is at least 3.0 and no more than 8.0;
R is 5;
R is in a range from 3.0 up to and including 7.0;
R is at least 4;
R is greater than 2 and less than 10

Some embodiments moderate 316 the bump 212 by altering computer-readable memory content, namely, by moving 320 a control point 210 of the spline 208 to a position 216 for which the data points P1, P2, and P3 are suitably spaced with respect to the factor R. P2 may be pinned to the curve so that P2 moves as the control point is moved. In some embodiments, the data point P2 is also the control point of the spline, so P2 is inherently pinned to the curve. More generally, one or more points of the curve (data points on the curve and/or control points of the curve) may be moved 320 in order to make a set of curve data points have suitable spacing with regard to any of the outlier 226 definitions (a), (b), (c), or (d) defined above.

In some embodiments, bump moderation 316 is a real-time moderation 318, namely, it occurs in real-time as the curve 206 is being drawn on a display 120. In some embodiments, the display displays 322 the spline as part of a digital ink curve, and bump moderation logic 202 moderates the bump in real-time as the digital ink curve is being defined. The curve 206 (digital ink or otherwise) can be defined by using curve data (P1, P2, P3, . . . ) from a data input device 122 such as a stylus or a fingertip position sensor.

Some embodiments identify 310 a control point pathway 220 which is neither the curve nor the spline, and move 320 the spline control point along the control point pathway. That is, the control point pathway contains the control point both before and after bump moderation. In some, the control point pathway is not a subset of the curve or the spline, and in some it contains at least one control point of the spline. The control point may be moved 320 to a particular location on the control point pathway 220, such as its midpoint, or the control point may be moved to a particular portion of the control point pathway, such as its central third or central fifth.

In some embodiments, the control point pathway used 312 is a quadratic Bezier spline segment defined by P1, P2, and P3 before the bump moderation, with the quadratic Bezier spline segment 224 passing through P1 and P3. In some, P2 is also a quadratic Bezier control point for the control point pathway. In some embodiments, the control point pathway used 314 is a straight line segment 222, such as the line segment defined by P1 and P2 before bump moderation, or a straight line segment defined by P1 and P3 before bump moderation.

Some embodiments display 322 at least a portion of the digital ink curve on the display with the bump moderated. The bump can be moderated 316 before the curve is displayed 322, so that only the moderated bump is shown to users, or else both versions of the bump (pre- and post-moderation) can be displayed, depending on the embodiment.

Figure 5:
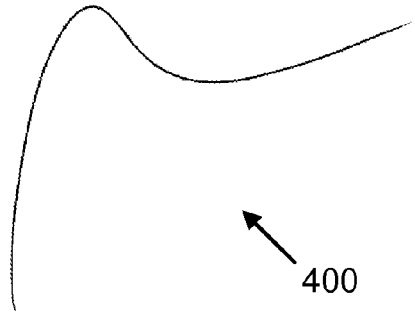
FIG. 5 is the curve of FIG. 4, including the bump, but without any annotation other than a curve 400 reference aid.
Figure 6:
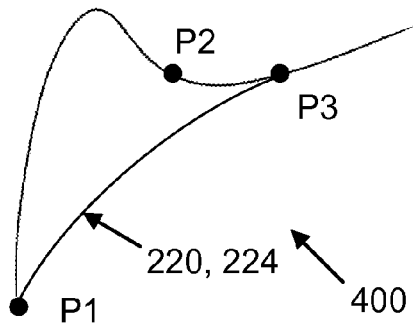
FIG. 6 is the curve of FIGS. 4 and 5, annotated with a Bezier spline segment as a control point pathway, to help illustrate control point movement.

FIG. 6 shows the curve of FIGS. 4 and 5, annotated with a Bezier spline segment 224 as a control point pathway 220.

Figure 10:
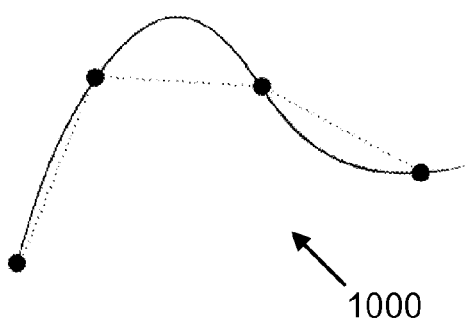
FIG. 10 is part of a curve in which data points are suitably spaced, and hence not in a condition calling for bump moderation.
Figure 7:
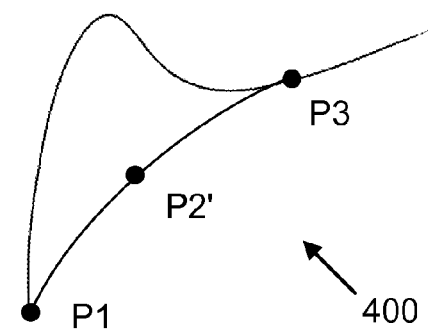
FIG. 7 is the curve of FIGS. 4 to 6, showing movement of a control point to a new position P2' on the Bezier spline segment but not yet showing moderation of the bump in response to the movement of the control point.
Figure 8:
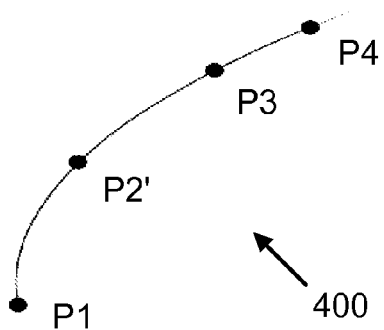
FIG. 8 is the curve of FIGS. 4 to 7, showing the control point in its new position P2' and also showing moderation of the bump in response to the movement of the control point.
Figure 9:
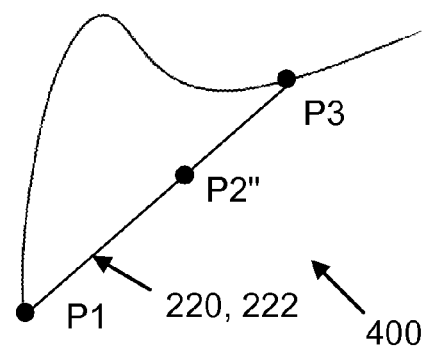
FIG. 9 is the curve of FIGS. 4 and 5, annotated with a line segment as the control point pathway, and showing the control point in a new position P2" on the line segment but not showing moderation of the bump in response to the movement of the control point.

FIG. 7 shows the curve of FIGS. 4 to 6, showing movement of a control point P2 to a new position P2' on the Bezier spline segment but not yet showing the effect of moderation 316 of the bump in response to the movement 320 of the control point. FIG. 8 shows the curve 400 of FIGS. 4 to 7, showing the control point in its new position P2' and also showing moderation of the bump in response to the movement of the control point. FIG. 9 is an alternative to FIG. 6, in that the curve of FIGS. 4 and 5 is again shown, but a line segment 222 is used 314 as the control point pathway, instead of using 312 Bezier spline segment 224. FIG. 9 also shows the control point in a new position P2" on the line segment, but does not show moderation of the bump in response to the movement of the control point; that image would be similar to FIG. 8. FIG. 10 is an alternative to FIGS. 4 through 9, in that the curve 1000 has data points are suitably spaced, and hence (unlike curve 400) is not in a condition calling for bump moderation.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as code in bump moderation logic 202, a spacing suitability factor R 204, and control and/or data point movement pathways 220, in the form of data 118 and instructions 116, read from a removable medium 114 and/or another source such as a network connection, to form a configured medium. The configured medium 112 is capable of causing a computer system to perform technical process steps for bump moderation as disclosed herein. The figures thus help illustrate configured storage media embodiments and process embodiments, as well as system and process embodiments. In particular, any of the process steps illustrated in FIG. 3 and/or FIGS. 4 through 9, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from Project Code Name Austin ("Austin") documentation. Austin includes a program implemented by Microsoft Corporation to help illustrate the power and performance of the C++ programming language. Aspects of the Austin program and/or documentation are consistent with or otherwise illustrate aspects of the embodiments described herein. However, it will be understood that Austin documentation and/or implementation choices do not necessarily constrain the scope of such embodiments, and likewise that Austin and/or its documentation contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure. In the event of an inconsistency, this document governs over what appears in Austin code or documentation.

Given four points, the cardinal spline function gives a curve which passes through the middle two points, and is visually smooth with respect to all four points. Given points $P_1, P_2, P_3, P_4$, the cardinal spline function which passes through $P_2$ and $P_3$ is given by:

$$CS_{1234}(t) = (2t^3 - 3t^2 + 1)*P_2 + (-2t^3 + 3t^2)*P_3 +$$
$$(t^3 - 2t^2 + t)*L*(P_3 - P_1) + (t^3 - t^2)*L*(P_4 - P_2)$$

where L is a smoothness factor (e.g., 0.5), and t ranges from 0 to 1.

Consider a case with four input samples (points) as shown in FIG. 10. The dashed line represents how an application 124 could connect the points without smoothing. The solid line represents the cardinal spline-smoothed curve. The resulting line looks visually appealing.

But now consider a case where the input points are not evenly spaced apart, namely, FIG. 4. The cardinal spline can give bump effects in part of the curve. Note the bump in the curve 400 just to the left of point P2. Using cubic splines for smoothing is advantageous due to their relatively low complexity, resulting in faster computation and enabling real-time smoothing. But because cardinal splines are an aggregate of cubic functions, undesirable bumps 212 can occur when input samples are too irregularly spaced.

In order to use the cardinal spline in these conditions, some embodiments do the following. First detect the case where a bump occurs, that is, determine 308 that points are not suitably spaced. Unsuitable spacing occurs when the distance between points P1 and P2 is too much larger than the distance between points P2 and P3. Empirically, the inventors found one such ratio to be 5:1, which corresponds to factor R 204 having the value 5. When unsuitable spacing is detected, bump moderation logic 202 moves point P2. In one example, P2 is moved to a position halfway along the quadratic Bezier curve segment defined by points P1, P2 and P3; see FIGS. 6 and 7. FIG. 6 shows the quadratic Bezier curve which passes through points P1 and P3, but not through point P2, and FIG. 7 shows the halfway point labeled P2'.

Simplified, this algorithm can be represented thus:

if $(|P_2-P_1|>5*|P_3-P_2|)$ $P_2'=(P_1+2*P_2+P_3)/4$

Now the graphics application can smooth the curve using the same spline technique as before, but since P2 has been moved 320 to a new position, the smoothed curve doesn't have an undesirable bump (FIG. 8).

The quadratic Bezier curve of three points $P_1, P_2, P_3$ is a smooth approximation of a curve passing through the two outer points. Mathematically, it is given by the parameterized function with t ranging from 0 to 1:

$B_{123}(t)=(1-t)^2*P_1+2(1-t)*t*P_2+t^2*P_3$

The halfway point is given when t=0.5

$B_{123}(0.5)=0.25*P_1+0.5*P_2+0.25*P_3$

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification. Their elements and/or teachings may be copied word-for-word or paraphrased into the specification after filing without constituting new matter.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An automated process for visibly moderating a bump in a digital ink curve which is already visually smooth through at least N points, the process utilizing a particular device which has a computer-readable memory, a display, and logic (software interoperating with hardware) to perform the process, the process including the following steps performed by the logic:
    getting in the computer-readable memory N data points for the digital ink curve, N being at least three, the N data points including at least a point P1, a point P2, and a point P3 which are positioned in that order relative to each other along a spline of the digital ink curve, the bump being a part of the spline and having a peak;
    computationally determining that the data points P1, P2, and P3 are not suitably spaced, in that an outlier is present in the linear distances between the data points P1, P2, and P3, namely, a linear distance between a first pair of the points P1, P2, and P3 is larger than R times a linear distance between a second pair of the points P1, P2, and P3, and the factor R is at least 3.0 and no more than 8.0;
    moderating the bump by altering computer-readable memory content, namely, by moving a control point of the spline to a position for which the data points P1, P2, and P3 are suitably spaced; and
    displaying at least a portion of the digital ink curve on the display with the bump moderated.

2. The automated process of claim 1, in which the data point P2 in the getting step is also the control point of the spline in the moderating step.

3. The automated process of claim 1, in which the spline is a cardinal spline.

4. The automated process of claim 1, wherein the process moderates the bump in real-time as the digital ink curve is being defined using curve data from a data input device.

5. The automated process of claim 1, in which the data points P1, P2, and P3 are not suitably spaced with respect to a factor R, in that a linear distance between a first pair of the points is larger than R times a linear distance between a second pair of the points, and the factor R is 5.

6. The automated process of claim 1, wherein:
    the process further comprises identifying a control point pathway which is neither the curve nor the spline; and
    the control point pathway contains the control point before the moderating step, and also contains the control point after the moderating step.

7. The automated process of claim 6, wherein the control point pathway includes one of the following:
    a quadratic Bezier spline segment defined by P1, P2, and P3 before the moderating step, in which the quadratic Bezier spline segment passes through P1 and P3 and also has P2 as a quadratic Bezier control point;
    a straight line segment defined by P1 and P2 before the moderating step; or
    a straight line segment defined by P1 and P3 before the moderating step.

8. The automated process of claim 6, wherein the moderating step moves the control point to a position midway along the control point pathway.

9. A computer-readable storage medium configured with data and with instructions that when executed by at least one processor causes the processor(s) to perform a technical process for visibly moderating a bump in a digital ink curve, the process utilizing a device which has a computer-readable memory and a display, the process comprising the steps of:
    getting in the computer-readable memory N data points for the digital ink curve, N being at least three, the N data points including at least a point P1, a point P2, and a point P3 which are positioned in that order relative to each other along a spline of the digital ink curve, the bump being a part of the spline and having a peak that is located between two of the data points;
    determining that the data points P1, P2, and P3 are not suitably spaced in that an outlier is present in the linear distances between the data points P1, P2, and P3, namely, a linear distance between a first pair of the points P1, P2, and P3 is larger than R times a linear distance between a second pair of the points P1, P2, and P3, and the factor R is at least 3.0 and no more than 8.0;
    identifying a control point pathway which is not a subset of the curve or the spline, and which contains a control point of the spline; and
    moderating the bump by moving the control point of the spline to a position on the identified control point pathway for which the data points P1, P2, and P3 are suitably spaced when P2 is pinned to the curve as the control point is moved.

10. The configured storage medium of claim 9, wherein the moderating step occurs as the curve is being drawn on the display.

11. The configured storage medium of claim 9, wherein the control point pathway includes one of the following:
    a quadratic Bezier spline segment defined by P1, P2, and P3 before the moderating step, in which the quadratic Bezier spline segment passes through P1 and P3 and also has P2 as a quadratic Bezier control point;
    a straight line segment defined by P1 and P2 before the moderating step; or
    a straight line segment defined by P1 and P3 before the moderating step.

12. The configured storage medium of claim 9, wherein the moderating step moves the control point to a position within a central one-fifth of the control point pathway.

13. The configured storage medium of claim 9, in which the data point P2 in the getting step is also the control point of the spline in the moderating step.

14. The configured storage medium of claim 9, in which an outlier is present in that a point-to-point distance in a set of linear distances between the data points is more than one standard deviation away from an average of the linear distances in the set.

15. A computer graphics system comprising:
a logical processor;
a memory in operable communication with the logical processor;
a set of data points residing in the memory and including at least a point P1, a point P2, and a point P3 which are positioned in that order relative to each other along a visually smooth spline of a digital ink curve, the spline having a bump with a peak;
a factor R in the memory, R being greater than 2 and less than 10;
a bump moderation logic which interacts with the processor and memory to moderate the bump by moving a control point of the spline from a position in which the data points P1, P2, and P3 are determined to be not suitably spaced with respect to the factor R to a position in which the data points P1, P2, and P3 are suitably spaced with respect to the factor R, namely, by moving the control point to a position for which a linear distance between P1 and P2 is no longer larger than R times a linear distance between P2 and P3 when P2 is pinned to the curve as the control point is moved; and
a display configured by displaying the spline after the bump is moderated.

16. The graphics system of claim 15, wherein the spline comprises at least one of the following: a cubic Hermite spline segment with finite difference tangents, a cardinal spline segment, a Catmull-Rom spline segment.

17. The graphics system of claim 15, wherein the bump moderation logic moves the control point to a position within a central one-third of a quadratic Bezier spline segment which is defined by P1, P2, and P3 before the bump is moderated, the quadratic Bezier spline segment passing through P1 and P3.

18. The graphics system of claim 15, wherein the bump moderation logic moves the control point to at least one of the following positions:
a position within a central one-third of a straight line segment that is defined by P1 and P2 before the bump is moderated;
a position within a central one-third of a straight line segment that is defined by P1 and P3 before the bump is moderated.

19. The graphics system of claim 15, wherein the data point P2 is also the control point before the control point is moved.

20. The graphics system of claim 15, further comprising a curve data input device, and wherein the display displays the spline as part of the digital ink curve and the bump moderation logic moderates the bump in real-time as the digital ink curve is being defined using curve data from the data input device.

* * * * *